Dec. 27, 1966 L. J. O'BRIEN 3,294,184
WELL DRILLING APPARATUS AND METHOD
Filed Dec. 17, 1962 2 Sheets-Sheet 1

FIG. I

INVENTOR.
LEO J. O'BRIEN
BY
ATTORNEY.

Dec. 27, 1966 L. J. O'BRIEN 3,294,184
WELL DRILLING APPARATUS AND METHOD
Filed Dec. 17, 1962 2 Sheets-Sheet 2

INVENTOR.
LEO J. O'BRIEN
BY Edward H Lang
ATTORNEY.

United States Patent Office 3,294,184
Patented Dec. 27, 1966

3,294,184
WELL DRILLING APPARATUS AND METHOD
Leo J. O'Brien, Crystal Lake, Ill., assignor, by mesne assignments, to Union Oil Company of California, Los Angeles, Calif., a corporation of California
Filed Dec. 17, 1962, Ser. No. 244,960
7 Claims. (Cl. 175—65)

This invention relates to a method and apparatus for drilling wells. More particularly, the invention relates to a method and apparatus for utilizing electrofluids as well drilling fluids.

In the drilling of oil wells it is often necessary to adjust the viscosity of the drilling fluid. Such changes are sometimes necessary to improve transport of cuttings. These adjustments are ordinarily made by altering the chemical composition of the drilling fluid by incorporating additives therein to adjust the physical properties of the fluid as required. When such changes of composition are made, improved operation awaits a uniform change in composition throughout the circulation pattern. It is also often necessary to add materials, commonly weighting agents, to decrease the possibility of blow-out or pressure damage to the well.

None of these methods has proved to be entirely satisfactory since considerable delay and expense are involved in changing the characteristics of the drilling fluid, and because the drilling fluid characteristic (for example viscosity), when adjusted to the optimum condition from one point of view, may be entirely unsatisfactory from another point of view. For example, a high viscosity may be desirable to provide adequate lifting of chips and fragments from the well bore. This high viscosity may, however, require that the drill string be raised or lowered at very low rates of speed when changing drill bits to prevent blow-outs or fracturing of the formation.

It is an object of this invention to provide a method and apparatus whereby the viscosity of the drilling fluid in the well bore, or in a selected portion of the well bore, can be instantaneously adjusted to any desired value within a wide range of viscosities. Other objects of the invention will become apparent from the following description, which will be made with reference to the drawings, of which:

The method of this invention utilizes electric field-responsive fluids, commonly called electrofluids, which display a dramatic increase in apparent viscosity in the presence of an electric field. The fluids themselves form no part of this invention, but are well known in the art as electro-viscous fluids and are described in patents e.g., Winslow 2,417,850 and 3,047,507 and in the literature. Some such fluids are produced by incorporating finely divided particulate solids, such as finely powdered silica, in a dielectric vehicle which is usually a refined hydrocarbon oil such as a while oil, or a low-viscosity lubricating oil fraction.

Various additives are incorporated in such fluids to serve different purposes. For example, it is usual to incorporate a fluidizing agent which permits the use of greater quantities of particulate solids without raising the residual viscosity of the product to an undesirably high level. Where it is desired to employ a D.C. rather than an A.C. field to activate the fluid, small amounts of basic nitrogen-containing compounds are usually added. In the practice of the instant invention, where large quantities of field-responsive fluids are required, and a rather high residual fluid viscosity is desirable, it is preferred to use alternating potential to control the apparent viscosity of the electrofluid in the well bore. Where little or no fluidizer or basic nitrogen compounds have been added, the tendency of the electrofluid to emulsify upon contact with formation water is reduced.

Figure 1:
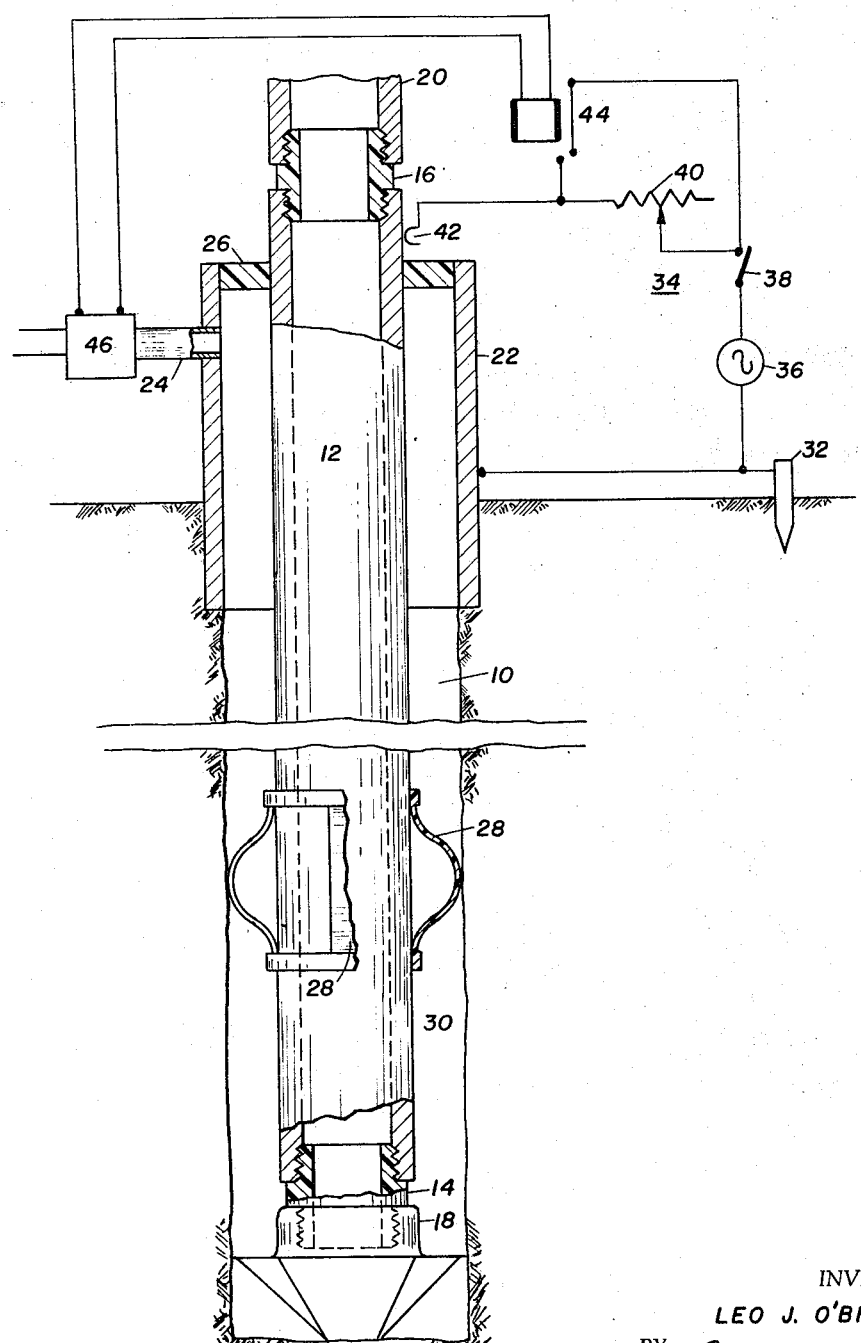
FIGURE 1 is a sectional drawing of a well bore including drilling apparatus and electrical circuitry in accordance with this invention.

Referring to FIGURE 1, within well bore 10 is disposed drill string 12 which is supported by a drilling rig, not shown. Electrically insulating spacers 14 and 16 are incorporated in the drill string to separate electrically the central portion of the drilling string from drill bit 18 and connector section 20 which contacts the drilling rig. The bore being drilled is provided with a conventional surface casing 22, from which extends pipe 24 through which drilling mud is conveyed from the bit. Electrically insulating spacer 26 is provided to form a seal between the surface casing 22 and drill string 12. One or more electrically insulating spacers 28 are provided to maintain the drill string in spaced relation with the well bore. The spacers are conventional except that they are fabricated of a tough, electrically insulating material rather than of steel. In drilling the well bore an electrofluid drilling mud is circulated downward through drill string 12 and upward through the annulus 30 between the wall of well bore 10 and drill string 12. The viscosity of the drilling fluid can be controlled over an extremely wide range by the application of electric potential between drill string 12 and the rock or soil which forms the well bore wall. This can be accomplished by grounding one terminal of the potential source to stake 32, since the soil will usually have ample conductivity to transmit the very low currents required to control the viscosity of the drilling fluid. Thus the electric field will be applied radially to the annular column of electrofluid standing in the well bore. Means 34 for controllably applying an electric potential comprises potential source 36, switch 38, variable resistance 40, brush ring 42, relay 44, and electrical pressure senser 46, together with the wiring as shown. In operation, relay 44 is normally open, and switch 38 is closed to energize the electrofluid. The magnitude of the applied potential is controlled by means of variable resistance 40. The applied potential ordinarily will be varied within the range of 10,000 to 250,000 volts per inch of average drilling fluid thickness. Where the column of drilling fluid is annular, and the electric field is applied radially of the annular column, as shown and preferred, the magnitude of the applied potential will be in the range of 10,000 to 250,000 volts per inch of average radial distance between the drill string and the wall of the well bore. Within this range of potential the viscosity of the drill fluid can be varied over an extremely wide range, from substantially the residual viscosity of the drill fluid to a semi-solid condition at which the drill fluid will cease to flow.

At very high potentials the electrofluid will tend to secure the drill string rigidly to the well bore. At lower potentials the viscosity of the drill fluid will merely be increased to some desired value at which adequate drill fluid performance will be obtained but the drill fluid maintained at a viscosity at which it is pumpable and at which no undue interference with rotation of the drill string will occur. The viscosity of the column of drilling fluid within the drill string, will, of course, not be affected. Therefore it is desirable that the drilling mud should have an abnormally low residual viscosity, whereby the energy required to pump the drill fluid is substantially reduced due to the low viscosity of the column of fluid in the drill string. Upon leaving the drill string and passing upward through the annulus, the drill fluid will come under the influence of the applied electric field and will thereupon acquire the desired viscosity as controlled by the magnitude of the applied electric field. Electric pressure-sensing device 46 is incorporated in the circuit to control relay 44, and cause relay 44 to close upon the sensing of excess pressure within the well bore. The function of relay 44 is to short-circuit potentiometer 34, whereby the total output of potential source 36 is applied to the drilling fluid. This circuit serves as an anti-blow-out safety device. If there is an excess of pressure rise within the well bore, indicating danger of blow-out, relay 44 will close, applying the total potential available from source 36 to the electrofluid and rendering the electrofluid solid, especially in a zone between the drill stem and surface casing 22. Direct connection is preferably made between the grounded terminal of the potential source and surface casing 22. The drilling fluid will be rendered solid, or semi-solid, and the well bore will be effectively sealed against blow-out. Corrective measures may then be taken, as by readjusting potentiometer 40 to apply maximum potential, then manually opening relay 44, and cautiously readjusting potentiometer 40 to reduce the magnitude of the applied potential and slowly bleed pressure from the well bore. In any event, the excessive pressure will be placed under control so that remedial action can be planned and taken.

While the invention may be practiced employing either an A.C. or D.C. potential source, the use of an A.C. potential source is preferred in that it makes possible the use of a less expensive electric field-responsive drilling mud. Also, the use of alternating potential is advantageous in that it avoids possible galvanic, electrolytic, and electrophoretic effects in the formation.

Figure 2:
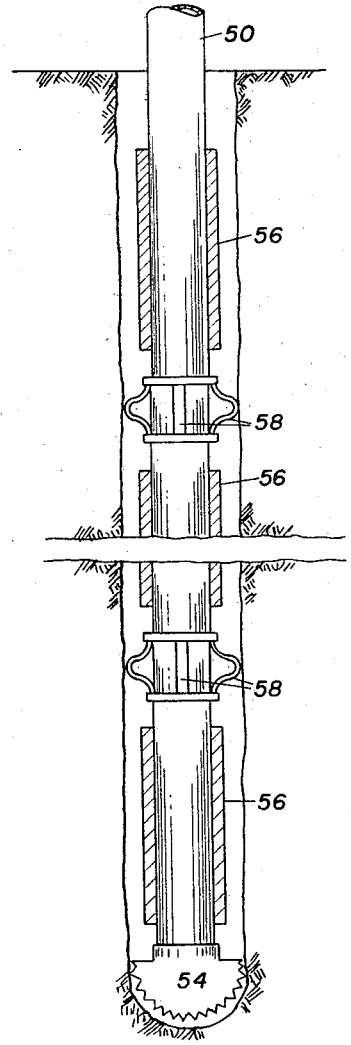
FIGURE 2 is a drawing of an alternative apparatus.

An alternate apparatus for the practice of this invention is shown in FIGURE 2. An electric field responsive drilling mud is piped downward through drill string 50. The drill fluid emerges at the bottom of the well from bit 54 and returns through the annulus to the surface of the earth. Electric potential is applied to a series of tubular electrodes designated 56, which are supported from the drill string in insulated relation therewith. An electrical conductor, not shown, is employed to make connection with electrodes 56. In this embodiment it is not necessary to insulate the drill string from the drill bit or from the drill rig. By making the electrodes 56 rotatable with respect to the drill string, drag which would otherwise be produced by the increased viscosity of the drill fluid is avoided. Conventional spacers 58, which may be similar to spacers 28 of FIGURE 1, but need not be electrically insulated are disposed on the drill string between adjacent electrodes, to maintain the drill string central in the well bore and therefore maintain the spaced relationship between the electrodes and the well bore.

Figure 3:
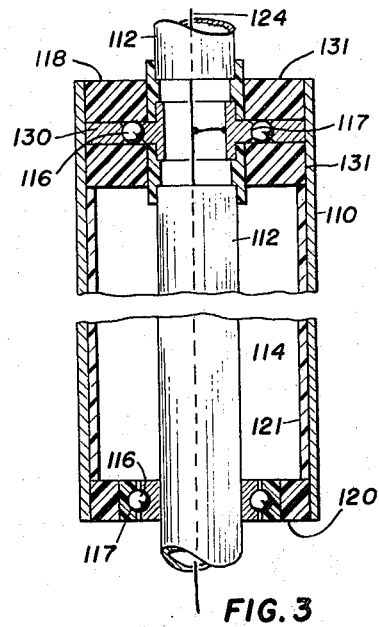
FIGURES 3 and 4 are detailed drawings of the apparatus of FIGURE 2.
Figure 4:
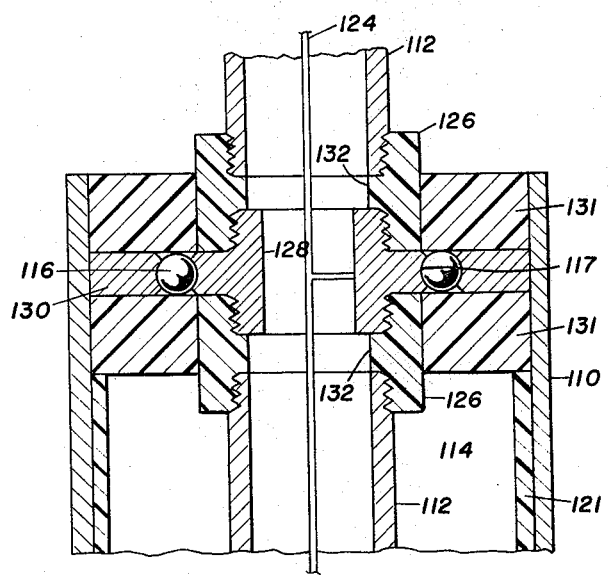

Details of the tubular electrodes 56 and means for supporting them from the drill string are shown in FIGURES 3 and 4. A section of pipe 110, about 20 feet in length and at least 2 inches larger in diameter than drill pipe 112, encompasses drill pipe 112 and forms annular space 114 between pipes 110 and 112. Drill pipe 112 can rotate freely in pipe 110 because ball bearings 116 and races 117 are provided in spacers 118 and 120 which seal annular space 114 and which center drill pipe 112 in larger pipe 110. Between spacers 118 and 120 there is insulating material 121 which is attached to the inner wall of pipe 110. This insulating material tends to prevent an increase in viscosity of any mud which may enter annular space 114. The coating of insulating material 121 is preferably thick, in the order of ¼ inch in thickness. Within drill pipe 112 there is mounted a small electrical conduit 124 which is insulated from the drill pipe and serves to make electrical connection between the pipe or electrode 110 and the potential source.

Further details of the upper bearing seal are shown in FIGURE 4. Lower bearing seal 120 may be identical but it may also be simpler because all that is required of it is that it insulate pipes 110 and 112 from each other, and that it permit rotation. In FIGURE 4, there are two insulating couplings 126, one above and one below, which insulate metal ring 128 from the sections of pipe 112 above and below it. The electrical potential necessary for the functioning of this device is conducted from the surface of the earth down through conduit 124, through metal ring 128, ball bearings 116 and metal annulus 130 to electrode 110. Metal annulus 130 is sandwiched between non-conducting annular rings 131. The insulating couplings 126 have raised unthreaded bands 132, against which the drill pipe 112 and metal ring 128 can seal while keeping these metals out of electrical contact with each other.

While the invention has been described with reference to specific embodiments, it will be evident that it can be practiced otherwise than as specifically described. For example, various means for generating and controlling the applied potential will be apparent to those skilled in the art. Also, the electrode configurations disclosed in FIGURES 3 and 4 are subject to wide variation.

The manner in which the process of the invention is practiced is also subject to modification. For example, only a single electrode assembly, as shown in FIGURE 3, may be appended to the drill string adjacent the surface of the earth where it is not desired to vary the viscosity of the fluid down hole, but only desired to employ the principle of this invention to control excess pressure which may develop in the well bore and produce danger of blow-out. It will also be evident that the prevention of blow-out can be accomplished otherwise than be sensing pressure in the well bore, for example, by sensing excess flow rate of drilling fluid from the well bore to the drill pit.

The embodiments of the invention in which an exclusive property or privilege is claimed are defined as follows:

1. In a method for drilling a well bore by the rotary method wherein a drill string extends substantially through the length of the bore, the improvement comprising circulating in the bore a drilling fluid that exhibits a change in apparent viscosity upon the application of an electric field, and varying the viscosity of said fluid in at least a portion of the annulus between the drill string and the wall of the well bore by applying an electric field thereto.

2. The method in accordance with claim 1 in which said fluid is circulated downward internally of the drill string and upward through the annulus external to the drill string and internal to the well wall, and said electric field is applied substantially radially of the annulus.

3. The method in accordance with claim 2 in which said field is an alternating field having an intensity in the range of 10,000 to 250,000 volts per inch of effective annulus thickness.

4. The method in accordance with claim 2 in which the field is applied by connecting one pole of an alternating potential source to ground, and the other pole of said source to the drill string.

5. The method in accordance with claim 2 including the step of disposing a tubular electrode in said annulus in spaced relation with said drill string and well wall, said electrode being disposed circumferentially about the drill string and insulated therefrom, and in which said field is applied by connecting one terminal of a potential source to ground and the other terminal of the potential source to said electrode.

6. In combination with a well drilling apparatus including a drill string, a drill bit, and means for supporting the drill string, the improvement comprising electrically insulating means for mechanically connecting said drill string and said bit, electrically insulating means mechanically connecting said drill string and said support means, electrically insulating spacer means disposed along the length of said drill string for maintaining said drill string in radially spaced relation with a well bore, and a source of electric potential having a positive and negative terminal, one of said terminals being connected to said drill string between said electrically insulating means for mechanically connecting said drill string and said bit and said electrically insulating means mechanically connecting said drill string and said support means, and the other of said terminals being connected to ground for applying electric potential between said drill string and ground.

7. An apparatus in accordance with claim 6 including pressure responsive means operatively connected to said source of electric potential for automatically increasing the magnitude of the applied potential in response to abnormally high pressure within the well.

References Cited by the Examiner

UNITED STATES PATENTS

| | | | |
|---|---|---|---|
| 2,118,669 | 5/1938 | Grebe | 204—180 |
| 2,217,857 | 10/1940 | Byck | 204—180 |
| 2,283,206 | 5/1942 | Hayward | 204—180 |
| 2,368,777 | 2/1945 | Price | 204—180 |
| 2,625,374 | 1/1953 | Neuman | 204—180 |
| 2,799,641 | 7/1957 | Bell | 204—180 |
| 2,944,019 | 7/1960 | Thompson | 252—8.5 |

FOREIGN PATENTS

| | | |
|---|---|---|
| 505,709 | 5/1939 | Great Britain. |
| 650,753 | 3/1951 | Great Britain. |

OTHER REFERENCES

Rogers: Composition and Properties of Oil Well Drilling Fluids, 1st edition, 1948, Gulf Publishing Co., Houston, Tex., p. 388.

CHARLES E. O'CONNELL, *Primary Examiner.*

T. A. ZALENSKI, D. H. BROWN, *Assistant Examiners.*